Sept. 26, 1944.  G. A. TINNERMAN  2,358,890
SPRING NUT FASTENER
Filed Sept. 3, 1941
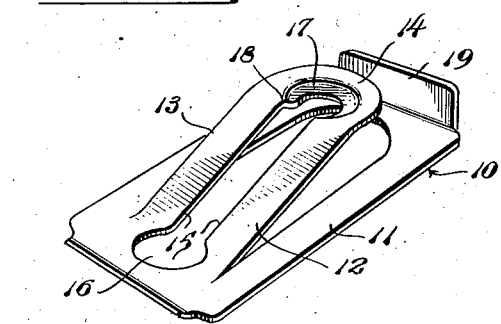
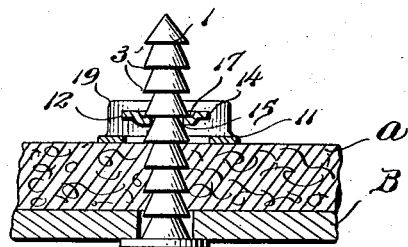
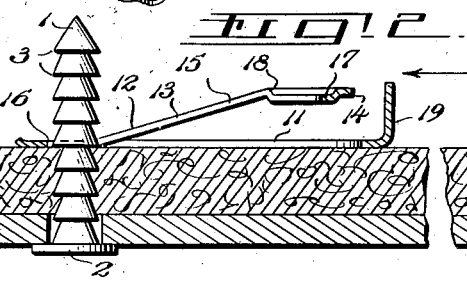
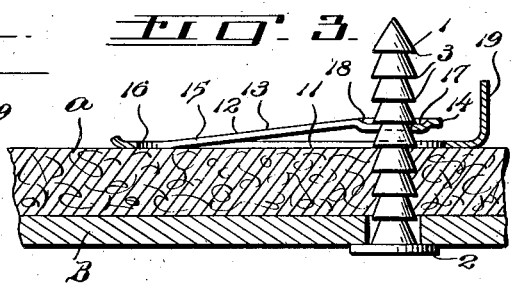
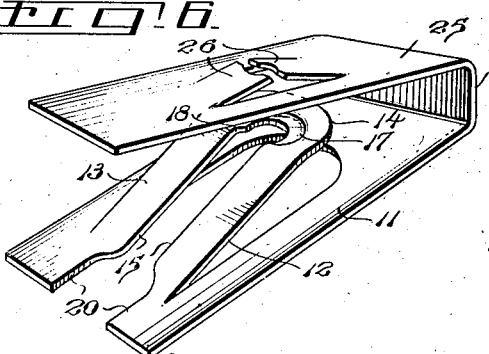
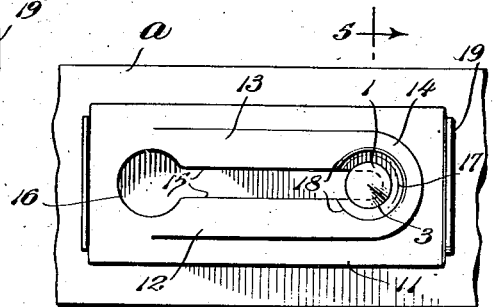
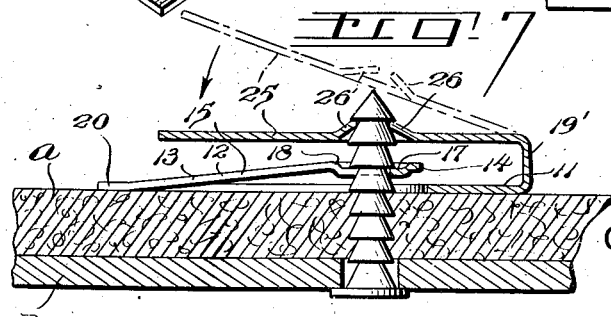
Inventor:
GEORGE A. TINNERMAN
H. J. Lombard
Attorney Patented Sept. 26, 1944

2,358,890

UNITED STATES PATENT OFFICE 2,358,890

SPRING NUT FASTENER

George A. Tinnerman, Cleveland, Ohio, assignor to Tinnerman Products, Inc., Cleveland, Ohio, a corporation of Ohio Application September 3, 1941, Serial No. 409,423

13 Claims. (Cl. 85—36)

This invention is directed to fasteners of the type embodying a sheet metal spring locking plate or the like designed for use with a cooperating bolt or stud fastening member in the manner of a nut device for securing the parts of an assembly.

More particularly, the invention deals with an improved form of sheet metal spring nut device adapted to fasten with a transversely grooved, barbed or otherwise shouldered bolt or stud by being applied generally transversely of the stud to a position in which the parts secured thereby are clamped firmly and rigidly under continuously effective spring force.

In many installations which are subject to continuous vibratory motion and heavy usage, heretofore known fasteners of this character have been found to lack the combination of required resiliency and durability to absorb the effects of shock and vibration as necessary to withstand loosening or removal from applied fastening position over any extended period of use. It is a primary object of the present invention to provide such a fastener comprising a simple, inexpensive sheet metal device which is applied generally transversely to fastening engagement with a cooperating bolt or stud and which embodies an improved construction making for increased resiliency coupled with durability whereby the fastener is capable of withstanding severe conditions of shock, vibration and the like in providing a strong and reliable fastening assembly over a long period of service.

Another object is to provide a fastener of this character having an improved simplified construction which lends itself to the very economical quantity production of the fasteners.

Still another object is to provide such a fastener which is simple, durable and considerably cheaper in cost than other similar types of fasteners and, in addition, has the desired increased resiliency for securing the parts of an assembly under a high degree of continuously effective spring force in a manner to absorb the effects of any shock, vibratory motion or the like which could possibly cause a loosening or removal of the fastening device from applied fastening position.

A further, more specific, object of the invention is to provide a fastener of the kind described which is relatively cheaper in cost in that less material is required in forming the same from a comparatively small sheet metal body providing a base and a complementary spring arm member provided from the material of said base to extend out of the plane thereof in yieldable relation thereto in a manner to provide for increased resiliency in such a fastener and otherwise supply a high degree of spring tension on the cooperating bolt or screw in applied fastening position in a completed assembly.

A still further object is to provide such a sheet metal fastener in which the complementary spring arm member is struck from the base of the fastener to extend in yieldable relation thereto in a manner to exert a progressively increasing axial spring force on the bolt or stud on being applied to fastening engagement therewith, and which spring arm member is provided with means for preventing movement of the fastener in a direction toward loosening or removal from finally applied fastening engagement with the bolt or stud.

Still another object of the invention is for the provision of a fastener of this character having an upturned end portion to which a tool may be applied for easily and quickly applying the fastener and also for releasing the same.

Further objects and advantages, and other new and useful features in the construction, arrangement and general combination of parts of the invention will be readily apparent to those skilled in the art as the description thereof proceeds with reference to the accompanying drawing, for purposes of illustration but not of limitation, in which like reference characters designate like parts throughout the same, and in which:

Fig. 1 is a perspective view of a preferred form of the improved fastener;

Fig. 2 is a sectional view showing the fastener as initially applied to a stud in position for securing the parts of an assembly;

Fig. 3 is a similar view showing the fastener in finally applied fastening position;

Fig. 4 is a plan view of Fig. 3; and

Fig. 5 is a sectional view of Fig. 4 taken on line 5—5, looking in the direction of the arrows;

Fig. 6 is a perspective view of a fastener comprising a further embodiment of the invention; and, Fig. 7 is a sectional view showing an assembly secured by the fastener of Fig. 6.

Referring now, more particularly, to the drawing, Fig. 1 shows on an enlarged scale the general construction of the improved fastener which may be produced at very low cost from a relatively small, inexpensive blank of any suitable sheet metal, preferably spring metal or cold rolled metal having spring-like characteristics. The fastener may, of course, be formed from blanks of various outlines, but from the standpoint of most economical quantity production, is best provided from a relatively small, generally rectangular blank which may be obtained at low cost from ordinary sheet metal strip stock with a minimum loss or waste of material. The fasteners otherwise are characterized by a simplified construction embodying a high degree of resiliency and which construction is admirably suited for quantity production at very low cost in that only a single thickness of metal stock is required and merely the simplest stamping and forming operations are involved such that the devices may be manufactured on standard punch presses at tremendously high rates of production.

Generally speaking, the fasteners are so constructed as to have what may be termed a sliding, wedge-type of fastening action with a cooperating bolt or stud in securing any two or more parts A, B, in an assembly under a continuously effective spring clamping force. The bolt or stud 1 may be of any suitable character comprising a barbed, grooved or otherwise shouldered shank which may be driven into and through the parts to be secured or otherwise passed through aligned openings therein with a leading end portion of said shank projecting from the rearward side of the assembled parts.

In the present example, the stud is shown in a preferred form comprising an enlarged head 2 and a ring-barbed shank defining a plurality of spaced shoulders 3 which afford certain advantages when one or more of the parts secured is of relatively soft, porous composition such as fibrous insulating material used in refrigerators, automobile bodies, etc., or sheathing board or the like to which are secured shingles or siding slabs in various building constructions. In this respect, bolts or studs having such a ring-barbed shank serve the dual purpose, first, of providing sufficient holding ability in the fibrous insulating material, sheathing board, or the like, A, for temporarily installing shingles or other parts B in proper assembled relation thereon prior to finally securing said parts, whereas an ordinary nail having only a smooth or roughened shank would not be held with sufficient gripping force for this purpose by the relatively soft and porous composition of such materials; and second, such a barbed shank defines a pronounced shoulder or rib construction with which the cooperating spring nut fasteners 10 applied thereto from the rearward side of the installation are capable of positive locking action in fastening the parts A, B, in permanently secured position, as presently to be described.

The ring-barbed stud otherwise is such as to define a series of sharp abutments or shoulders 3 spaced by grooves receiving the adjacent surrounding material of part A on being driven therein to interlock with the shank and engage particularly said shoulders 3 thereof and thereby resist withdrawal of the stud after being applied to install the parts to be secured in temporary fastening position. Even though the relatively soft and porous composition of part A lacks sufficient body to retain ordinary nails, the use of the ring-barbed studs provides for sufficient holding power to retain the part B thereon effectively in temporarily installed relation; and thus, in a building construction, for example, a speedy and economical method of procedure involves the temporary installation of shingles on the exterior side of an area of sheathing to completion, if desired, before the application of the cooperating spring fasteners 10 to the studs from the interior side of the sheathing for permanently securing the shingles thereto.

In providing the general type of fastener shown in Fig. 1, the selected form of blank or sheet metal body 10, is designed to define a suitable base 11 from which is stamped or struck and formed a cooperating stud retaining element 12 in the form of substantial spring arm or the like which is integral at one end with said base 1 and extends in inclined spaced relation thereto in a manner to provide for a high degree of resiliency relative to and in cooperation with said base 11. Said spring arm element 12 otherwise is so formed to include an intermediate portion 13 which is inclined gradually from said base and terminates in a free end portion 14 extending in predetermined generally parallel and spaced relation to said base 11

The spring arm is provided with a longitudinal slot 15 of substantially uniform width extending from adjacent the area in which said spring arm is integral with the base 11 of the fastener to the substantial center area of the free end portion 14. The width of said slot is only slightly greater than the root diameter of the shank at the bottoms of the grooves adjacent the shoulders 3 such that when the spring arm of the fastener is connected to the stud in engagement with any of said shoulders, as shown in Fig. 5, there is provided a positive locked relation from which the spring fastener cannot be removed by movement axially of the stud. Said slot 15 terminates in an enlarged circular stud receiving opening 16 lying substantially entirely in the base 11 of the fastener adjacent the area in which the spring arm 12 is integral therewith. Said opening 16 is of a size for receiving readily the overall diameter of the stud shank as defined by the shoulders 3, and preferably with only slight clearance in order that the stud may be received readily in said opening and the adjoining edges of the slot 15 easily and quickly guided into engagement with the adjacent shoulder 3 of the engaged ring-barb of the stud.

At the end of the slot 15 in the free end portion 14 of the spring arm, the surrounding marginal edge preferably is provided with a depression forming a rigid, generally annular seat 17 for the shoulder of the engaged ring-barb and which seat is bordered by a retaining rim defining locking elements or projections 18 adjacent the slot 15 which prevent any movement of the fastener in a direction toward removal from applied fastening engagement with the stud. The spring arm 12 otherwise is provided in a more or less predetermined spaced relation to the base 11 according to service requirements and the amount of resiliency necessary for clamping the parts of the assembly most effectively under continuous spring force. Preferably one end of the base 11 is bent upwardly to provide a flange 19 which may be grasped by the fingers or engaged by a suitable tool for easily and quickly applying the fastener, or for removing the same in a minimum of time and effort.

From the foregoing, it will be understood that the fastener constructed substantially as described and shown in Fig. 1 is applied as illustrated in Fig. 2, by first positioning the stud receiving opening 16 therein over the projecting pointed end of the stud extending through the parts A, B, to be secured. The flat base 11 of the fastener is pressed flush against the adjacent rearward face of part A to take up any clearance in the assembly and otherwise dispose the adjacent edges of the slot 15 on either side of the stud shank under the shoulder defined by the ring-barb 3 to be engaged by said edges bordering the slot. The fastener is then pushed or slid longitudinally in the direction indicated by the arrow in Fig. 2, to the position shown in Fig. 3, and during this action the engaged shoulder 3 of the stud rides on the longitudinal edges bordering the slot 15 over the intermediate inclined portion 13 of the spring arm. This causes the spring arm to be compressed toward the base 11 of the fastener as necessary for the engaged shoulder 3 to snap over the retaining rim portions 18 onto the free end portion 14 of the spring arm to be finally positioned on the seat 17 defined by the depression around the adjacent end of the slot 15. It will be understood that in such application of the fastening device whereby the engaged shoulder 3 rides on the inclined intermediate portion 13 of the spring arm, said spring arm exerts a progressively increasing camming or wedging action on said shoulder to draw the stud axially and tighten the assembly of secured parts A, B. In the final fastening position of the fastener as shown in Figs. 3, 4, and 5, the spring arm 12 is maintained in a constantly tensioned condition from the initial, normal position thereof shown in Fig. 2, and thereby exerts a continuous axial pull on the stud as the base 11 of the fastener resiliently engages the adjacent part A and clamps the same to part B under continuously effective spring force in the completed fastening installation. In this relation, the engaged shoulder 3 of the stud is firmly and rigidly positioned on the seat 17 beyond the adjacent rim portions 18 which define locking projections adapted to engage the stud and prevent any reverse movement of the fastener in a direction toward removal from applied fastening position.

Removal of the fastener may be effected readily by a suitable force on the fastener as through flange 19, to cause the spring arm 12 to be depressed sufficiently for the engaged shoulder 3 to ride over the locking projections 18 and otherwise slide on the inclined intermediate portion 13 to a position in which the stud is aligned with the stud receiving opening 16, whereupon the fastener may be removed easily and quickly in more or less the reversal of the foregoing described procedure for applying the fastener to fastening position.

Figs. 6 and 7 illustrate another embodiment of the invention wherein the fastener is provided with a spring arm struck and formed from the base in a construction similar to that illustrated and described with reference to Figs. 1–5 inclusive except for the stud receiving opening 20 provided in the base 11 of the fastener. In this instance, said stud receiving opening 20 is enlarged and extended to the adjacent edge of the base to define an opening on said edge which facilitates the application of the fastener to the stud by being initially applied in a direction transversely thereto simultaneously with engagement of the longitudinal edges adjacent the slot 15 with the engaged shoulder 3 of the stud. The fastener of this character otherwise may be provided in a construction substantially equivalent to that of Figs. 1–5 inclusive for operation and use in a similar manner.

In a still further embodiment of the invention, a return bent portion 25, provided in extension of the flange 19' in overlying relation to the base 11, is provided with a stud opening defined by yieldable stud engaging elements 26 adapted to snap over the pointed end of the stud and engage a shoulder thereon other than that engaged by the spring arm 12 to positively lock the fastener against any possible loosening or removal from applied fastening position. As illustrated by the broken line showing in Fig. 7, said return bent portion 25 defines a locking member which is angularly disposed with respect to the base of the fastener in initial position with the opening therein defined by the yieldable stud engaging elements 26 so provided as to align with and receive the stud when said leg member is flexed downwardly in the direction of the arrow to the position of the full line showing of Fig. 7. The said stud engaging elements 26 preferably are provided in the manner of opposed cooperating tongues which are sufficiently yieldable to flex as necessary to permit the extremities thereof to pass easily over the end of the stud and snap into positive locked abutting relation with the shoulder on the stud engaged thereby.

The spring fastener in any form of the invention preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and preferably harder than that of the cooperating bolt or stud employed therewith in providing an effective and reliable fastening means adapted for a long period of satisfactory service and use.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

Reference is made to my divisional application Serial No. 485,184, filed April 30, 1943, for claims relating particularly to the embodiment of Figs. 1 to 5 inclusive.

What is claimed is:

1. A fastener comprising a sheet metal body defining a base and a member partially severed from the base and deflected therefrom providing a resilient spring element integral at one end with said base and extending out of the plane of said base in spaced yieldable relation thereto, said spring element having a slot communicating with an enlarged opening adapted to readily receive a cooperating stud for securing the parts of an assembly, and means defined by the marginal edges of said slot for engaging the stud with said spring element compressed toward the base of the fastener and exerting continuous axial spring force on said stud in applied fastening position.

2. A fastener comprising a sheet metal body defining a base and a member struck and formed therefrom providing a resilient spring element integral at one end with said base and merging into an adjacent inclined portion terminating in a free end portion extending in generally parallel and spaced relation to said base, said spring element having a slot communicating with an enlarged opening adapted to readily receive a cooperating stud for securing the parts of an assembly, and means defined by the marginal edges of said slot in the free end portion of the spring element for engaging the stud with said spring element compressed toward the base of the fastener and exerting continuous axial spring force on said stud in applied fastening position.

3. A fastener comprising a sheet metal body defining a base and a member struck and formed therefrom providing a resilient spring element integral at one end with said base and having a free end portion extending out of the plane of said base in spaced yieldable relation thereto, said spring element having a slot communicating with an enlarged opening adapted to readily receive a cooperating stud having a shoulder, means defined by the marginal edges of said slot for engaging said shoulder including a depression about the end of the slot in the free end portion of the spring element, said depression being adapted to seat said shoulder in the applied position of the fastener with said spring element compressed toward the base of the fastener and exerting continuous axial spring force on said stud.

4. A fastener comprising a sheet metal body defining a base and a spring element inclined with respect to said base and having a slot communicating with an enlarged stud passage for readily receiving a cooperating stud in securing the parts of an assembly, means defined by the marginal edges of said slot for engaging the stud under spring tension in the applied fastening position of the fastener, and a return bent portion overlying the base of the fastener defining means for engaging the stud in cooperation with said spring element to lock the fastener in such applied fastening position.

5. A fastener comprising a sheet metal body defining a base and a member struck and formed therefrom providing a resilient spring element integral at one end with said base and having an adjacent inclined portion terminating in a free end portion extending out of the plane of said base in spaced yieldable relation thereto, said spring element having a slot communicating with an enlarged opening adapted to readily receive a cooperating stud in securing the parts of an assembly, said spring element being adapted to be gradually compressed toward the base of the fastener as the marginal edges of said slot are engaged with the stud along the inclined portion of the spring element to dispose said free end portion thereof in engagement with the stud in applied fastening position exerting continuous axial spring force on said stud, and a return bent member overlying the base of the fastener and provided with means for engaging the stud in cooperation with said spring element to lock the fastener in such applied fastening position.

6. A fastener comprising a sheet metal body defining a base and a member struck and formed therefrom providing a resilient spring element integral at one end with said base and having an adjacent inclined portion terminating in a free end portion extending out of the plane of said base in spaced yieldable relation thereto, said spring element having a slot communicating with a stud passage open at the adjacent end of said base for readily receiving a cooperating stud in securing the parts of an assembly, the marginal edges of said slot along the inclined portion of the spring element defining means for engaging the stud in the application of the fastener to provide an axial drawing action on said stud as said spring element is compressed toward the base of the fastener, means bordering said slot in the free end portion of the spring element adapted to engage the stud in the applied fastening position of the fastener with said spring element compressed toward the base of the fastener and exerting continuous axial spring force on said stud, and a return bent member overlying the base of the fastener and provided with an opening defined by tongues or the like for engaging the stud in cooperation with said spring element to lock the fastener in such applied fastening position.

7. A fastener comprising a U-shaped body made of a single integral piece of resilient sheet metal comprising two arms connected by a return bend, one of the arms having an opening for the passage of a stud, the material of such arm adjacent the opening being deflected from the plane of the arm to form an edge adapted to engage the stud, the other arm being provided with a portion partially severed from that arm and bent at an acute angle to the plane of that arm, said portion having an opening adapted to register with the opening of the other arm, whereby a single stud may occupy the openings of both arms.

8. A fastener comprising a U-shaped sheet metal body comprising respectively upper and lower arms connected by a return bend, the upper arm having an opening for the passage of a stud, the material of the arm adjacent the opening being deflected from the plane of the arm to form an edge adapted to engage the stud, the lower arm being provided with a portion partially severed from that arm and bent from the plane of that arm, said portion having an opening adapted to register with the opening of the upper arm, the distortion of the upper arm being upwardly above the plane of such arm and the direction of the partially severed lower arm being upwardly above the plane of that arm.

9. An attaching clip having an aperture for receiving the shank of a stud, said clip comprising a pair of arms having portions extending in the same general direction, a shank-engaging portion on one arm and a slotted lip integral with the other arm and having a free end portion severed from and normally inclined out of the plane of said other arm and toward the first mentioned arm, said lip being yieldable.

10. A fastener comprising a U-shaped body made of a single integral piece of resilient sheet metal comprising two arms connected by a return bend, one of the arms having an opening for the passage of a stud, the material of the arm adjacent the opening being deflected from the plane of the arm to form an edge adapted to engage the stud, the other arm being provided with a portion extending from the free end of such arm toward the bend and attached to that arm only adjacent said free end, whereby said portion has a flexibility in addition to that of the arm carrying it, said portion having an opening adapted to register with the opening of the other arm whereby a single stud may occupy the openings of both arms, there being a slot in said portion extending from the extreme end of the arm inwardly to the bolt opening through such portion.

11. A fastener comprising a strip of resilient sheet metal doubled on itself to make two arms connected by a return bend and extending therefrom in the same general direction, one of said arms having an opening through it and a pair of integral tongues on opposite sides of the opening slitted from the arm but attached thereto at the end of the tongues opposite the opening, said tongues being diverted to stand at an acute angle to the arm and having their end edges adapted to engage in a groove of a grooved stud passing through the opening, the other arm having an intermediately located slot extending from the outer end of the arm inwardly, the portion of the last-mentioned arm bounding the slot comprising a U-shaped member attached to that arm only adjacent the outer end of the arm and the return bend of the U being beyond the axis of the stud which may occupy the opening of the other arm, whereby said slot provides space for said stud.

12. A fastener comprising a U-shaped body made of a single integral piece of resilient sheet metal comprising two arms connected by a return bend, one of the arms having an opening for the passage of a stud, the material of the arm adjacent the opening being deflected from the plane of the arm to form a stud-engaging portion, the other arm being provided with a portion partially severed from that arm and bent at an incline from the plane of that arm toward the other arm, such included portion having an opening adapted to register with the opening of the other arm, whereby a single stud may occupy the openings of both arms, the stud-engaging portion of the upper arm comprising a pair of tongues on opposite sides of the opening, each anchored to the arm in a region comparatively distant from the opening and bent upwardly at the end adjacent the opening.

13. A fastener comprising a U-shaped body made of a single integral piece of resilient sheet metal comprising two arms connected by a return bend, one of the arms having an opening for the passage of a stud, the material of the arm adjacent the opening being deflected from the plane of the arm to form an edge adapted to engage the stud, the other arm being provided with a portion partially severed from that arm and bent at an acute angle from the plane of that arm toward the one arm, said portion having an opening adapted to register with the opening of the one arm whereby a single stud may occupy the openings of both arms, there being a slot in said portion extending from the extreme end of the arm inwardly to the bolt opening through such portion.

GEORGE A. TINNERMAN.